(12) United States Patent
Bennett (10) Patent No.: US 7,023,864 B2
(45) Date of Patent: Apr. 4, 2006

(54) DATA PACKET DISCARDING

(75) Inventor: Jon C. R. Bennett, Sudbury, MA (US)

(73) Assignee: RiverDelta Networks, Inc, Horsham, PA (US)

( * ) Notice: Subject to any disclaimer, the term of this patent is extended or adjusted under 35 U.S.C. 154(b) by 903 days.

(21) Appl. No.: 09/844,216

(22) Filed: Apr. 30, 2001

(65) Prior Publication Data

US 2002/0075799 A1 Jun. 20, 2002

Related U.S. Application Data

(60) Provisional application No. 60/201,010, filed on May 1, 2000.

(51) Int. Cl.
*H04L 12/28* (2006.01)

(52) U.S. Cl. .................. 370/412; 370/230; 370/235

(58) Field of Classification Search ............ 370/235, 370/230.1, 232, 230, 412, 468
See application file for complete search history.

(56) References Cited

U.S. PATENT DOCUMENTS

| 5,748,629 | A | 5/1998 | Caldara et al. ............ 370/389 |
| 5,872,769 | A * | 2/1999 | Caldara et al. ............ 370/230 |
| 6,556,578 | B1 * | 4/2003 | Silberschatz et al. ....... 370/412 |
| 6,657,955 | B1 * | 12/2003 | Bonneau et al. ............ 370/229 |
| 6,671,258 | B1 * | 12/2003 | Bonneau .................... 370/235 |
| 2001/0010692 | A1 * | 8/2001 | Sindhu et al. .............. 370/395 |

OTHER PUBLICATIONS

Endo, et al., Large Scale Enterprise ATM Node with per-VC Traffic Control; Computer Networks; 31 (1999) 617-625.
Notification of Transmittal of The International Search Report or the Declaration, mailed Dec. 14, 2001.

* cited by examiner

*Primary Examiner*—Chi Pham
*Assistant Examiner*—Blanche Wong
(74) *Attorney, Agent, or Firm*—Lawrence T. Cullen (57) ABSTRACT

A system for hierarchically storing packetized data and transferring the packetized data includes an input configured to receive packets of data, a memory coupled to the input and configured to store packets of data, an output coupled to the memory and configured to transfer packets of data from the memory, and a controller coupled to the memory and configured to control the memory to store packets of data in queues associated with a hierarchy in which a first level of the hierarchy includes a group of queue group components, wherein at least one of the queue group components in the group at the first level includes a group of queue group components associated with a second level of the hierarchy that is different from the first level of the hierarchy.

17 Claims, 5 Drawing Sheets

DATA PACKET DISCARDING

CROSS-REFERENCE TO RELATED APPLICATIONS

This application claims the benefit of U.S. Provisional Application Ser. No. 60/201,010 entitled "DATA PACKET DISCARDING" and filed May 1, 2000.

BACKGROUND OF THE INVENTION

The invention relates to electronic communications and more particularly to packet-switched data networks.

In packet-switched networks, packets of digitized data are sent from a source to a destination, often in different routes depending upon capabilities and availabilities of different links between the source and the destination. Data are routed through links connecting nodes. Data can be sent across various links stemming from a node.

Unlike telephone networks where all traffic travels on circuits of fixed bandwidth where the sum of the bandwidth of all the circuits at any point does not exceed the speed of the link connecting network nodes, in packet networks it is often the case that the sum of the bandwidth of the traffic that wishes to cross a link between networking components exceeds the speed of the link. When this occurs there are more packets arriving at the node than can be transmitted, such a condition is referred to as overload or congestion. The packets that can not be transmitted immediately can be discarded or stored in a buffer for later transmission. Since there is a finite amount of storage space, if the overload condition persists eventually the buffer capacity of the node will be exhausted and all incoming packets will have to be discarded until the transmission of a packet frees some buffer space.

Packet networks are typically shared by multiple users and these users may have differing service requirements. The network may be able to selectively discard packets during overload to try to meet these different user requirements. The users are essentially anything that causes packets of data to be transmitted to a network such as humans, applications running on computers, network-attached hardware devices, or combinations of any of these. The term flow may be used interchangeably with user, although a user might have more than one flow.

Systems with FIFO scheduling/buffering mechanisms for selective packet discard typically involve discarding traffic based on its importance and how big the queue is when the packet arrives. In these mechanisms when the buffer is partially full low priority traffic is discarded, as the buffer becomes more full, traffic of higher priority is discarded. With such mechanisms it may be very difficult to "tune" the discard thresholds so that the system operates at high utilization and that all service requirements are met. In some cases it is impossible to achieve one without sacrificing the other.

SUMMARY OF THE INVENTION

Embodiments of the invention provide techniques for discarding packets of data in a packet-switched network based on a hierarchy of priorities.

In general, in an aspect, the invention provides a system for hierarchically storing packetized data and transferring the packetized data. The apparatus includes an input configured to receive packets of data, a memory coupled to the input and configured to store packets of data, an output coupled to the memory and configured to transfer packets of data from the memory, and a controller coupled to the memory and configured to control the memory to store packets of data in queues associated with a hierarchy in which a first level of the hierarchy includes a group of queue group components, wherein at least one of the queue group components in the group at the first level includes a group of queue group components associated with a second level of the hierarchy that is different from the first level of the hierarchy.

Implementations of the invention may include one or more of the following features. Each queue group component is associated with at least one of a logically-lower queue and a logically-lower queue group, and the controller is configured to control the memory to store packets of data in N levels of the hierarchy, wherein N is greater than two and at least one queue group component in each level other than the two logically-lowest levels includes at least two queue group components associated with a logically-lower level. The at least two queue group components associated with a logically-lower level are associated with a level immediately logically lower in the hierarchy. The controller is configured to control the memory to store multiple groups of queue group components in association with the first level of the hierarchy.

Implementations of the invention may also include one or more of the following features. Each queue group component is associated with at least one of a logically-lower queue and a logically-lower queue group, and the controller is configured to determine a discard priority, of at least one of the queue group components in the group of queue group components at the first level, for packet discard selection. The controller is configured to determine the discard priority based on at least one of queue size, type of source, size of source, and service requirements associated with a queue. The controller is configured to determine a discard value. The discard value varies directly with queue size. The controller is configured to determine a discard priority, of at least one of the queue group components at the second level, for packet discard selection. The controller is configured to determine the discard priority for packet discard selection for the at least one queue group component at the first level and the at least one queue group component at the second level differently. The controller is configured to discard at least one packet of data of a queue associated with a queue group component having a highest discard priority of the queue group components in the group at the first level. The group of queue group components at the first level is a first group, and wherein the controller is configured such that if the queue group component having the highest discard priority of the queue group components in the first group includes a second group of queue group components at the second level, the controller determines a discard priority for each queue group component of the second group of queue group components and discards at least one packet of data of a queue associated with a queue group component in the second group having the highest discard priority from among the second group. The at least one packet discarded by the controller is disposed at one of a head of, a tail of, and a random location in, the queue associated with the queue group component having the highest discard priority of the queue group components in the first group. The controller is configured to discard multiple packets of data from the queue associated with the queue group component having the highest discard priority regardless of whether the discard priority changes before all of the multiple packets of data are discarded. The controller is configured to determine the discard value for at least one queue group component in the group at the first level in a different manner than for at least one other queue group component in the group at the first level. The controller is configured to determine the discard value for the queue group component at the first level of the hierarchy that includes the group of queue group components at the second level of the hierarchy, the primary component, based on at least one of an effective size of the queue group and an effective size of a queue, at a level logically lower in the hierarchy than the second level, that is associated with at least one of the components at the second level that is associated with the primary component. The controller is configured to discard at least one packet of data of a queue associated with a queue group component having approximately a highest discard priority of the queue group components in the group at the first level. The controller is configured to discard at least one packet of data of a queue associated with a queue group component having a discard priority that is within a highest-priority range of discard values that is associated with at least one of the queue group components in the group of queue group components at the first level. The controller is configured to discard at least one packet of data of a queue associated with a queue group component in response to the memory at least attempting to store an amount of data that would exceed a data amount limit for the memory. The controller is configured to discard at least one packet of data of a queue associated with a queue group component in response to the memory at least attempting to store an amount of data that would exceed a data amount limit for a group of queues. The at least one packet of data is discarded from a queue other than a queue associated with the group whose data amount limit the memory at least attempting to exceed. The at least one packet of data is discarded regardless of whether the memory is at least attempting to store an amount of data that would exceed a data amount limit for the memory. The controller is configured to discard at least one packet of data of a queue associated with a queue group component according to at least one of: in response to the memory at least attempting to store an amount of data that would exceed a data amount limit associated with the system, and random early discard. The data amount limit is a queue size limit.

In general, in another aspect, the invention provides a system for hierarchically storing packetized data and transferring the packetized data, the apparatus including an input configured to receive packets of data, an output coupled to the memory and configured to transfer packets of data from the memory, and control means coupled to the input and to the output for storing packets of data received by the input in queues associated with a hierarchy where each level of the hierarchy includes at least one group of queue group components, and where at least one of the queue group components in each level other than a lowest level of the hierarchy includes a group of queue group components associated with a logically-lower level of the hierarchy, each queue group component being associated with at least one of a logically-lower queue and a logically-lower queue group, the control means also for transferring stored packets of data to the output.

Implementations of the invention may include one or more of the following features. The logically-lower level is immediately logically lower in the hierarchy. The control means is also for determining effective lengths of the queue group components. The control means is configured to determine the effective lengths based on at least one of queue size, type of source, size of source, and service requirements associated with a queue. The values of the effective length vary directly with queue size. The control means is also for discarding at least one packet of data of a selected queue associated with a queue group component that has a longest effective length among a hierarchical group under consideration for discard. The hierarchical group under consideration is associated with a queue group component at a higher level in the hierarchy that has the longest effective length of its associated group. The control means is for discarding multiple packets of data from the selected queue regardless of whether the queue group component associated with the selected queue ceases to have the longest effective length in its group before all of the multiple packets of data are discarded. The control means is configured to determine the effective lengths for at least two different hierarchical components differently. The control means is configured to discard at least one packet of data of a queue associated with a queue group component having an effective length that is within a highest-length range of effective lengths associated with a hierarchical group under consideration for discard.

In general, in another aspect, the invention provides a system for hierarchically storing packetized data and transferring the packetized data, the system including an input configured to receive packets of data, a memory coupled to the input and configured to store packets of data, an output coupled to the memory and configured to transfer packets of data from the memory, and a controller coupled to the memory and configured to control the memory to store packets of data in queues associated with a hierarchy in which a first level of the hierarchy includes a group of queue group components, wherein at least one of the queue group components in the group at the first level includes a group of queue group components associated with a second level of the hierarchy that is different from the first level of the hierarchy each queue group component being associated with at least one of a logically-lower queue and a logically-lower queue group, where the controller is configured to control the memory to store packets of data in N levels of the hierarchy, where N is greater than two and wherein at least one queue group component in each level other than the two logically-lowest levels includes at least one queue group and one other queue group component associated with a logically-lower level, and where the controller is configured to determine a discard priority, of each queue group component in the group of queue group components at the first level, for packet discard selection, the discard priority based on a discard value that varies directly with queue size of queues associated with the queue group components.

Implementations of the invention may include one or more of the following features. The controller is configured to determine the discard priority also based on at least one of type of source, size of source, and service requirements associated with a queue. The controller is configured to determine the discard priorities for packet discard selection for different hierarchy group components differently. The controller is configured to discard at least one packet of data of a selected queue associated with a queue group component having a highest discard priority of the queue group components in the group at the first level. The controller is configured to discard multiple packets of data from the selected queue regardless of whether the discard priority of the queue group component associated with the selected queue changes to less than the highest discard priority of its group before all of the multiple packets of data are discarded. The controller is configured to discard at least one packet of data of a selected queue associated with a queue group component having approximately a highest discard priority of the queue group components in the group at the first level. The queue group component having approximately the highest discard priority has a discard priority that is within a highest-priority range of discard values that is associated with at least one of the queue group components in the group of queue group components at the first level.

In general, in another aspect, the invention features a method for hierarchically storing packetized data and transferring the packetized data, the method including receiving packets of data at an input, and storing the received packets of data in queues according to a hierarchy where each level of the hierarchy includes at least one group of queue group components, and where at least one of the queue group components in each level other than a lowest level of the hierarchy includes a group of queue group components associated with a logically-lower level of the hierarchy each queue group component being associated with at least one of a logically-lower queue and a logically-lower queue group,.

Implementations of the invention may include one or more of the following features. The lower level is immediately logically lower in the hierarchy. The method may further include determining effective lengths of the queue group components. Determining the effective lengths is based on at least one of queue size, type of source, size of source, and service requirements associated with a queue. The values of the effective length vary directly with queue size. The method may further include discarding at least one packet of data of a selected queue associated with a queue group component that has a longest effective length among a hierarchy group under consideration for discard. The hierarchy group of queues under consideration is associated with a queue group component at a higher level in the hierarchy that has the longest effective length of its associated group. The discarding of at least one packet includes discarding multiple packets of data from the selected queue regardless of whether the queue group component associated with the selected queue ceases to have the longest effective length in its group before all of the multiple packets of data are discarded. Determining the effective lengths for at least two different hierarchy components is determined differently. The method may further include discarding at least one packet of data of a queue associated with a queue group component having an effective length that is within a highest-length range of effective lengths associated with a hierarchy group under consideration for discard.

Various embodiments of the invention may provide one or more of the following advantages. High data network utilization can be achieved. Various service requirements can be met for routing data. Data packet discard decisions can be made regarding a data packet after that packet has arrived at a node.

These and other advantages, and the invention itself, will be apparent from the following figures, description, and claims.

DETAILED DESCRIPTION OF PREFERRED EMBODIMENTS

Figure 1:
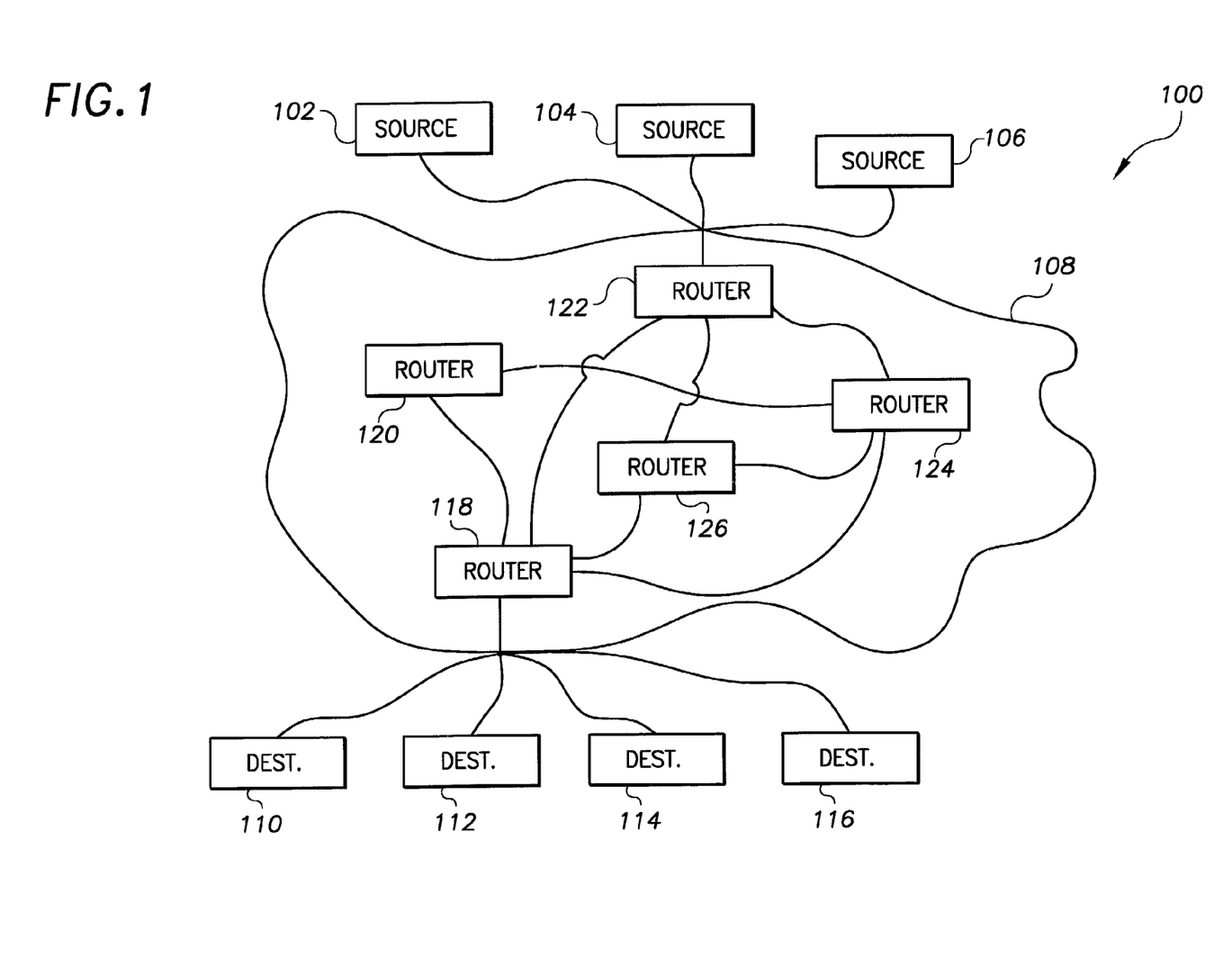
FIG. 1 is a schematic diagram of a communications system.

Referring to FIG. 1, a communications system 100 includes sources 102, 104, 106, a packet-switched network 108, such as the internet, and destinations 110, 112, 114, 116. Within the network 108 are routers or nodes 118, 120, 122, 124, 126 for routing data from the sources 102, 104, 106 toward the destinations 110, 112, 114, 116. Each of the connections shown are configured for bi-directional communication. Examples of sources include Internet Service Providers (ISPs), companies, departments of companies, grades of users, and individual users.

Figure 2:
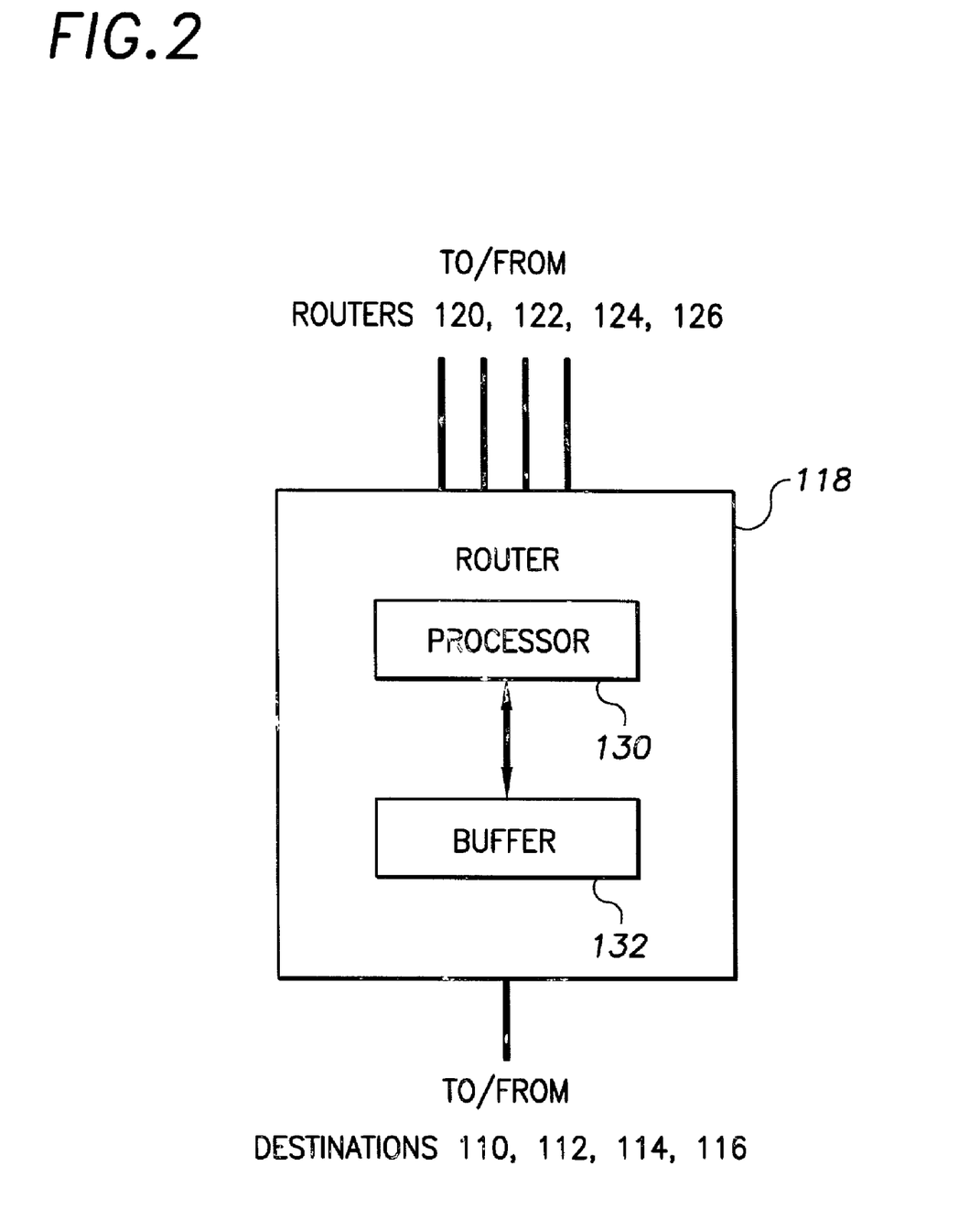
FIG. 2 is a schematic block diagram of a router shown in FIG. 1.

Referring to FIG. 2, an exemplary router, here router 118 of FIG. 1, includes a processor 130 and a buffer memory 132. The processor 130 is coupled to the buffer 132 for bi-directional communication. Packets of data can be stored in the buffer 132, and where and with what associations the packets are stored in the buffer 132 (e.g., see FIG. 3 and its associated description below), and when the packets are transmitted out of the buffer 132 are controlled by the processor or controller 130. The processor 130 can be, e.g., a Central Processing Unit (CPU) of a computer, such as a personal computer, that executes software code instructions to cause the processor to perform various functions as described above and below. Alternatively, the processor 130 can be hardware that operates substantially independently of software stored in memory. A hardware implementation of the processor 130 may operate faster than a software-controlled processor, and thus a hardware implementation may be preferred for operations on data of connections to the outside of the network 108 and a software-controlled implementation used for operating on data of connections to the inside of the network 108. The processor functions may be implemented using software, hardware, firmware, and/or hardwiring or combinations of any of these, and can be implemented by apparatus disposed in locations other than those described, including being distributed within the system 100.

Figure 3:
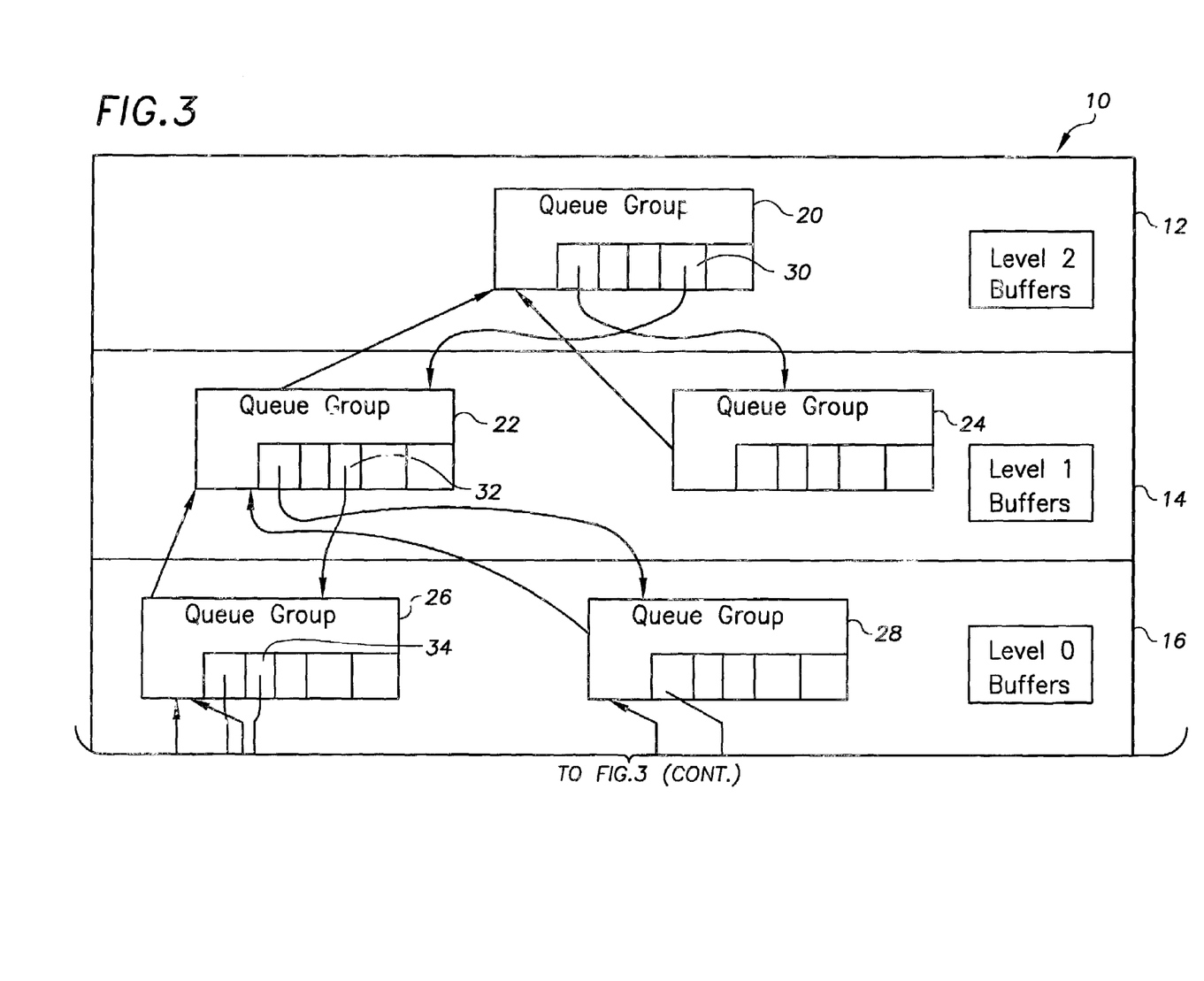
FIG. 3 is a block diagram of a queue hierarchy.

Referring to FIG. 3, a hierarchy 10 of packetized data associated with a packet-switched network node (e.g., stored in buffer 132 of router 118 of FIG. 2) includes three hierarchical levels 12, 14, 16 of queue groups and a hierarchical level 18 of packet queues. The levels of the hierarchy are logically lower or higher relative to other levels. Although three levels of queue groups are shown, other numbers of queue groups are acceptable such as one, two, or more than three. As shown, level 12 includes a queue group 20, level 14 includes queue groups 22, 24, and level 16 includes queue groups 26, 28.

Within each queue group, 20, 22, 24, 26, 28, there are queue group components, e.g., queue group component 30 of group 20, queue group component 32 of group 22, and queue group component 34 of group 26. The queue group components include/reference queues (e.g., storage locations of queues) and/or queue groups at lower levels in the hierarchy 10 (shown as references to queue groups). The queue components thus represent amounts of data being received and buffered for transmission from the node. At the levels above the lowest level of queue groups, here levels 12, 14, the queue group components shown in the queue groups 20, 22, 24 reference lower-level queue groups, namely queue groups 22, 24 (in group 20) and 26, 28 (in group 22). The queue group components shown in the lowest-level queue group, here groups 26, 28, reference queues (although a one-to-one correspondence of such components and queues is shown) of data packets. Each packet is explicitly or implicitly associated with a queue according to a programmed policy. Packets may be associated with queues according to various criteria such as port number and/or class. For example, packets may be associated with level 12 queue group components according to port number and associated with level 14 queue group components according to class, or vice versa.

In the queue groups there is also a mechanism for use in determining which queue in the hierarchy 10 to target for discard. The mechanism provides one or more indications as to which queue to target, or queue group to evaluate to determine a queue further down in the hierarchy to target, for discard. For example, the mechanism may be in the form of queue buckets with which queues and/or queue groups sharing a common attribute, e.g., range effective length or discard value (as discussed below), are associated.

The components within a queue group can be assigned priorities for discard. Unless queues are weighted, the longest (requiring most buffer space) queue group component (i.e., associated with queues requiring the most buffer space) will be assigned a discard value that, in comparison to other values in the component's group, makes the queue, or queue group, of that component the most likely to be, highest priority for being, subject to discard selection, i.e., discard for queues or, for queue groups, further evaluation to eventually determine a queue for discard. Thus, queue size of a queue or as a portion of a queue group size is used for determining the discard value. The discard value may be adjusted/weighted depending on one or more factors. For example, the queue group components may be assigned weights depending on the type of source of a queue, the size of the source of a queue, or the service requirements purchased by the source and/or associated with a queue. In the last example, a source can obtain a preferred weighting by purchasing a preferred service requirement. For example, an individual person could purchase more bandwidth than that purchased by an ISP.

Weighting the queues adjusts an effective length of the queues, at least for Longest Queue Discard (LQD) purposes. The weighting makes the queue's likelihood of discard objectively different, e.g., lower, although it may not be discarded any later than it would without weighting, e.g., if the weighting does not adjust the discard likelihood of the queue below the discard likelihood of another queue in the queue group, or adjust another queue's likelihood above the likelihood of the queue in question. Preferably the effective length, or other discard value, of a queue varies directly with the queue's size (required buffer space). The variance may be linear, but does not need to be so. The variance may be inversely proportional to the queue size. The effective length can be used as a discard value for determining discard priority of a queue. Similarly, queue group component weighting adjusts an effective buffer space requirement associated with each of the buckets. Discard likelihoods and/or values may be determined differently for portions of the hierarchy, e.g., different queue group components, different levels, and/or different queues.

Various formulae may be used to determine a weighting factor for a queue or queue group component. For example, more weight can be given to queues or queue group components according to how much has been (or will be) paid for processing the queues or the queues associated with the components. In another example, the effective length of queue1 (or component1) can be made smaller than the length of queue2 (or component2) if it would take longer to process the packet(s) of queue2 (or those associated with component2), so that packets that would be processed last will be discarded first. Preferably, however, whatever formula is chosen will cause a queue or queue group component to be objectively more likely to be targeted for discard selection the more bandwidth and/or buffer space the queue, or for a component the associated queue(s), requires.

Using LQD with weighted effective lengths, it is the longest effective-length queue that is discarded (i.e., one or more packets of the targeted queue will be discarded). Packets are discarded by de-allocating and/or re-allocating the memory storing the discarded packets such that other data can be written into the de-allocated and/or re-allocated memory. For the queue group components, discard selection priority (effective length) is determined similarly to that for queues and it is the queue group component with the highest effective buffer space requirement that is subjected to discard selection.

The highest discard priority of a queue or queue group component, however, does not require the highest discard value for that queue or queue group component relative to other queues or components in a group. The highest discard priority may be associated, e.g., with a queue or queue group component with the lowest discard value or the discard value closest to some number, be it arbitrarily determined or otherwise, in a group. Also, multiple components can have the same discard value.

At each level 12, 14, 16 of the hierarchy 10, the queue group component, and at level 18 the queue, with the highest discard likelihood is subjected to discard selection. This discard likelihood depends on the buffer space requirement of the queue or queue group component and any weighting of the queue or queue group component.

Figure 4:
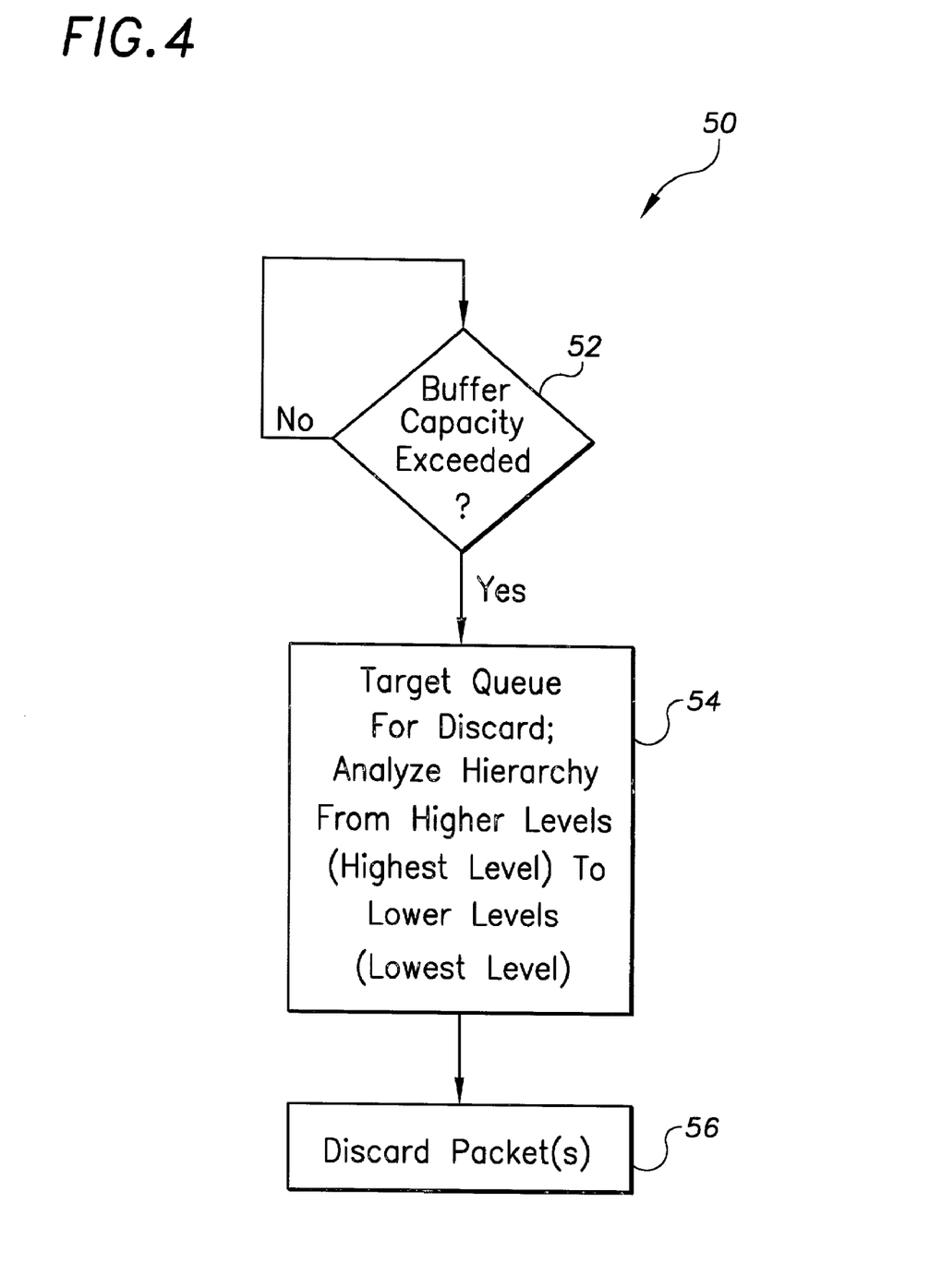
FIG. 4 is a block flow diagram of a process of discarding data packets.

Referring to FIG. 4 with further reference to FIGS. 1–3, in operation a process 50 of discarding packetized data includes a stage 52 in which it is determined that the buffer space capacity of the node associated with hierarchy 10 is being exceeded. The capacity may be physically exceeded (no more room) or administratively exceeded (e.g., a rule bars further storage or at least actuates discard). If the capacity is exceeded, then a packet (associated with a queue and possibly one or more queue groups) is targeted for discard at stage 54 as follows. Levels of the hierarchy 10 are analyzed for discard selection, preferably from higher levels to lower levels, and preferably from the highest level to the lowest level. Thus, at level 12, the queue group 20 is analyzed to determine the queue group component with the highest discard priority, here according to its discard value relative to other discard values in the group. Here, the component 30 is determined to have the highest such priority, with the component 30 referencing the queue group 22. Consequently, the queue group 22 at level 14 is analyzed for its queue group component with highest discard priority. Assuming queue group component 32 is subjected to discard selection at level 14, queue group 26 is analyzed at level 16 and it is determined that component 34 has the highest discard priority. Level 18 is analyzed, and in particular any queues corresponding to component 34, to determine the queue with the highest discard priority. This queue, here queue 36, the only queue in the bucket 34, is subjected to discard selection and one or more of this queue's packets are discarded at stage 54. The queue/queue group component subjected to discard selection may not necessarily be the longest, but approximately the longest queue/queue group component. The queues/queue group components may be associated with ranges of length (buckets) and a queue/queue group component in the range that has the largest length range and that has at least one packet in it may be the queue/queue group component subjected to discard selection (the highest discard priority queue/queue group component).

Subjecting to discard selection according to discard values/likelihoods continues until the buffer space capacity of the node associated with the hierarchy 10 is not exceeded by the sum of the queues waiting to be transmitted by the node, or until a predetermined amount of packets have been discarded.

The process 50 may have stages rearranged, added, or deleted without departure from the invention. For example, levels of the hierarchy 10 may be analyzed from lower level to higher level. Also, packet enqueuing and dequeuing typically occur along with the process 50, which affects which queue gets discarded and whether buffer capacity is exceeded.

The following provides further description of embodiments of the invention.

Embodiments of the invention provide packet pushout or longest queue discard (LQD) techniques. Embodiments of the invention provide a system where there is 'per flow' queuing such that it is not necessary to make the discard decision for a packet when it arrives in the queue. In an LQD system packets do not need to be discarded until the buffer is completely full, but may be (e.g., for policy reasons such as the imposition of a maximum queue size for a particular flow) discarded before the buffer is completely full. When the buffer is completely full, or a packet is to be discarded for any other reason, a packet is selected from a queue for discarding.

The following section describes a set of structures and methods for an implementation of hierarchical pushout suitable for implementation in hardware form. In this section, it is assumed that bucket queues are used in the hierarchy 10.

Packet Queue

The Packet Queue stores the packets which have been received and are awaiting transmission.

TABLE 1

Packet Queue Type 0

| Field Name | Size (bits) | Notes |
| --- | --- | --- |
| Queue Group | 18 | Pointer to Queue Group the Queue is a member of |
| Prev Bqueue | 18 | Pointer to previous Queue in buffer list |
| Next Bqueue | 18 | Pointer to next Queue in buffer list |
| Next Squeue | 18 | Pointer to next Queue in scheduler list |
| Head Packet | 18 | Pointer to first packet in Queue |
| Tail Packet | 18 | Pointer to last packet in Queue |
| Head Length | 12 | Length of packet at head of Queue |

The Queue Group pointer may not be used, e.g., if the groups are inferred such as from a packet ID.

Packet Queue-Groups

Packet Queue-Groups are used to maintain lists of Queues to implement the Longest Queue Pushout policy.

TABLE 2

Packet Queue Group

| Field Name | Size (bits) | Notes |
| --- | --- | --- |
| Queue Group | 18 | Pointer to Queue Group this Queue Group is a member of |

TABLE 2-continued

Packet Queue Group

| Field Name | Size (bits) | Notes |
| --- | --- | --- |
| Length | 25 | Queue length in bytes |
| Prev Gqueue | 18 | Pointer to previous Queue Group in list |
| Next Gqueue | 18 | Pointer to next Queue Group in list |
| Bucket Mask | 15 | Bit mask for keeping track of which buckets have entries. Used for finding the largest queue |
| Size N Queue Head | 18 | Pointer to Head Queue in list of Queues of size (N * 2K)–((N-1) * 2K) in length |
| Size N Queue Tail | 18 | Pointer to Tail Queue in list of Queues of size (N * 2K)–((N-1) * 2K) in length |
| Size 2 Queue Head | 18 | |
| Size 2 Queue Tail | 18 | |
| . | | |
| . | | |
| . | | |
| Size 256 Queue Head | 18 | Pointer to Head Queue in list of Queues of size 128*2K or larger |
| Size 256 Queue Tail | 18 | Pointer to Tail Queue in list of Queues of size 128*2K or larger |

The bucket mask indicates which buckets are non-empty. For example, a binary or logical 1 indicates non-empty and a binary or logical 0 indicates empty in the bit mask. The bit mask helps determine quickly which buckets are non-empty, but other techniques may be used to determine this.

For Packet Queue-Groups at higher levels of the hierarchy the number of "Size N Queue" bins will be larger, going to 64K packets or more for the upper levels.

The Packet Queue-Groups are used to implement the hierarchical management of packet buffer memory.

Buffer Management Algorithms

The following are pseudo code descriptions of techniques for handling data in the hierarchy 10. The pseudo code below uses shorthand familiar to those skilled in C programming language. "Old" and "new" variables are used to help accommodate changing weightings while packets are being processed.

Enqueue Packet:

```
1.  ENQUEUE_PKT (Q, PKT)
2.  {
3.   Old_Q_Length = Q->Length
4.   IF (Q->Tail == NULL){
5.    Q->Tail = PKT
6.    Q->Head = PKT
7.   } ELSE {
8.    Q->Tail->Next = PKT
9.    PKT->Prev = Q->Tail
10.   Q->Tail = PKT
11.  }
12.
13.  L_0_Buff = Q->Queue_Group;
14.  L_1_Buff = L_0_Buff->Queue_Group;
15.  L_2_Buff = L_1_Buff->Queue_Group;
16.  UPDATE_Q (Q, L_0_Buff, PKT->Length)
17.  UPDATE_Q (L_0_Buff, L_1_Buff, PKT->Length)
18.  UPDATE_Q (L_1_Buff, L_2_Buff, PKT->Length)
19. }
```

The Enqueue Packet algorithm handles incoming packets. The queue into which the packet is to be placed is checked to see if it is empty (line 4). If so, the packet is made the head and the tail of the queue (lines 5–6). Otherwise, the next tail pointer is made to point to the new packet (line 8). The new packet is made the tail and double linking to the previous packet is completed (lines 9–10). Queue group linking is effected to add the packet to the end of a corresponding linked list (lines 13–15). The corresponding buckets are updated due to the new size of the queue into which the packet was added (lines 16–18).

Dequeue Packet:

```
1. DEQUEUE_PKT (Q, C, SC)
2. {
3.   PKT = Q->Head
4.   IF (Q->Tail == PKT) {
5.     Q->Head = NULL
6.     Q->Tail = NULL
7.   } ELSE {
8.     Q->Head = PKT->Next
9.   }
10.  L_0_Buff = Q->Queue_Group;
11.  L_1_Buff = L_0_Buff->Queue_Group;
12.  L_2_Buff = L_1_Buff->Queue_Group;
13.  UPDATE_Q (Q, L_0_Buff, -1 * PKT->Length)
14.  UPDATE_Q (L_0_Buff, L_1_Buff, -1 * PKT->Length)
15.  UPDATE_Q (L_1_Buff, L_2_Buff, -1 * PKT->Length)
16.  Return PKT
17. }
```

The Dequeue Packet algorithm handles outgoing packets. If the packet to be removed is the only packet of the queue (line 4), then the queue is indicated as being empty by making the -head and tail be null (lines 5–6). Otherwise, the head pointer is made to point to the packet after the removed packet (line 8). Queue group linking is effected to remove the packet from the corresponding linked list (lines 10–12). The corresponding buckets are updated due to the new size of the queue from which the packet was removed (lines 13–15).

Pushout Packet:

```
1. PUSHOUT_PKT(L_N_Buff, Depth)
2. {
3.   Bucket = FIND_FIRST_1(L_N_Buff->Bucket_Mask)
4.   IF (Depth>0){
5.     L_(N-1)_Buff = L_N_Buff->Buckets[Bucket]->Head
6.     Length = PUSHOUT_PKT (L_(N-1)_Buff, Depth-1)
7.     Q= L_(N-1)_Buff;
8.   } ELSE {
9.     Q = L_0_Buff->Buckets[Bucket]->Head
10.    PKT = Q->Tail
11.    IF (PKT == Q->Head) { /* pushing out only packet in queue*/
12.      Q->Head = Q->Tail = NULL
13.    } ELSE { /* push out tail packet */
14.      Q->Tail = PKT->Prev
15.  }
16.  /* Add PKT to free lists */
17.  Length = PKT->Length
18. }
19. UPDATE_Q (Q, L_N_Buff, -1 * Length)
20. RETURN Length
21. }
```

The Packet Pushout algorithm is recursive to process the various levels of the hierarchy 10. The number of levels of processing and the group to be processed are given (line 1). A group is found that is non-empty from which to discard data (line 3). Pushout is called on that group and then Packet Pushout is called (lines 5–6). This continues until the depth is zero (line 8). If the tail is also the head (i.e., only one packet), then the head and tail are nulled (lines 11–12). Otherwise, the tail packet is pushed out (lines 13–14). The discarded length is returned and queue and queue buckets are updated through the hierarchy 10 (lines 17–20).

Update Queue:

```
1. UPDATE_Q (Q, C, PKT_Length)
2. {
3.   Min_Q = Q->Min_Q_Length
4.   Q_Weight = Q->Q_Weight
5.   Old_Length = Q->Length
6.   Q->Length = Q->Length + PKT_Length
7.   Old_Length = (MAX ((Old_Length - Min_Q, 0)) >> Q->Weight
8.   New_Length = (MAX ((Q->Length - Min_Q, 0)) >> Q->Weight
9.   Old_Bucket = FIND_FIRST_1(Old_Length)
10.  New_Bucket = FIND_FIRST_1(New_Length)
11.  Old_Bucket = MIN (Old_Bucket, C->Num_Buckets)
12.  New_Bucket = MIN (New_Bucket, C->Num_Buckets)
13.
14.  IF (Old_Bucket == New_Bucket) Return
15.
16.  If (Old_Bucket > 0){
17.    BUCKET_REMOVE (Q, C, Old_Bucket)
18.  }
19.  IF (New_Bucket > 0){
20.    BUCKET_INSERT (Q, C, New_Bucket)
21.  }
22. }
```

Update Queue may be performed for any of the operations affecting queues (pushout, enqueue, dequeue). Minimum queue length and the value of n (weight) in $2^n$ corresponding to a range of the queue size (i.e., between $2^n$ and $2^{n+1}-1$) are used as weighting factors (lines 3–4). Queue length currently and when processed are stored (lines 5–6) with the value of PKT_Length being negative for pushout and dequeue processing. Lengths are determined by binary shifting in accordance with the queue size ranges being associated with powers of 2 (lines 7–8). Using the binary length, the highest bucket is found (lines 9–10). If the queue is bigger than the highest size bucket, then the highest such bucket is used (lines 11–12). If the updated queue is in the same bucket, then nothing is done (line 14). If the updated queue is in a new bucket, then the queue is removed from the old bucket (lines 16–17) and inserted into the new bucket (lines 19–20).

Bucket Remove:

```
1. BUCKET_REMOVE (Q, C, Bucket_Num)
2. {
3.   Buckets = C->Buckets
4.   Is_Head = (Q == Buckets[Bucket_Num]->Head)
5.   Is_Tail = (Q == Buckets[Bucket_Num]->Tail)
6.
7.   IF (Is_Head && Is_Tail){
8.     Buckets[Bucket_Num]->Head = NULL
9.     Buckets[Bucket_Num]->Tail = NULL
10.    C->Bucket_Mask &=~(1 << Bucket_Num)
11.    Return
12.  }
13.
14.  IF (Is_Head){
15.    Buckets[Bucket_Num]->Head = Q->Next_BQueue
16.    Return
17.  }
18.
19.  IF (Is_Tail){
20.    Buckets[Bucket_Num]->Tail = Q->Prev_BQueue
21.    Return
22.  }
23.
24.  /* Q is not at the head or tail,
```

```
25. so it has a queue before and after it */
26.
27. Q->Prev_B->Next_B = Q->Next_BQueue
28. Q->Next_B->Prev_B = Q->Prev_BQueue
29. Return
30. }
```

The Bucket Remove algorithm removes a queue from a bucket. Inquiries are made to determine if the queue to be removed is at the head or the tail of a bucket (lines 4–5). If the queue is the only queue in the bucket (line 7), then the head and tail are nulled (lines 8–9) and the mask bit corresponding to the bucket is unset (line 10) using a bit-wise logical AND (&=), inversion (~), and a shift up (<<). If the queue is the head (line 14), then the head is pointed to the next queue in line (line 15). If the queue is the tail (line 19), then the tail is pointed to the queue previous to the removed queue (line 20). If the queue is between the head and the tail (lines 24–25), then the queues adjacent to the removed queue are made to point to each other (lines 27–28).

Bucket Insert:

```
1. BUCKET_INSERT (Q, C, Bucket_Num)
2. {
3. Buckets = C->Buckets
4. C->Bucket_Mask |= (1<<Bucket_Num)
5. IF (Buckets[Bucket_Num]->Head == NULL){
6. Buckets[Bucket_Num]->Head = Q
7. Buckets[Bucket_Num]->Tail = Q
8. Return
9. } ELSE {
10. Buckets[Bucket_Num]->Tail->Next_BQueue = Q
11. Q->Prev_BQueue = Buckets[Bucket_Num]->Tail
12. Buckets[Bucket_Num]->Tail = Q
13. Return
14. }
15. }
```

The Bucket Insert algorithm insets a queue into a bucket. The mask bit corresponding to the bucket is set (line 4) using a bit-wise logical OR (|=) and a shift up (<<) to indicate that the bucket is non-empty. If the new queue is the head and the tail (line 5), then the head and tail are pointed to the new (lines 6–7). Otherwise, the queues adjacent to the new queue are made to point to the new queue (lines 10–12).

These algorithms are applied throughout the hierarchy 10, although this is not required. For example, different techniques may be used in different portions of the hierarchy 10, e.g., within the same group, or within different groups or different levels. The hierarchy of accounting for packet push out need not correspond to other resource allocation hierarchies.

While the description here has been with regard to the management of the buffer at the output link of a network node, the techniques described herein may be used at any point where packets (or ATM cells) are buffered.

Other embodiments are within the scope and spirit of the appended claims.

What is claimed is:

1. A system for hierarchically storing packetized data and transferring the packetized data, the apparatus comprising:
   an input configured to receive packets of data;
   an output coupled to a memory and configured to transfer packets of data from the memory; and
   control means coupled to the input and to the output for storing packets of data received by the input in queues associated with a hierarchy where each level of the hierarchy includes at least one group of queue group components, and where at least one of the queue group components in each level other than a lowest level of the hierarchy includes a group of queue group components associated with a logically-lower level of the hierarchy, each queue group component being associated with at least one of a logically-lower queue and a logically-lower queue group, the control means also for transferring stored packets of data to the output,
   wherein the control means is also for determining effective lengths of the queue group components.

2. The system of claim 1 wherein the logically-lower level is immediately logically lower in the hierarchy.

3. The system of claim 1 wherein the control means is configured to determine the effective lengths based on at least one of queue size, type of source, size of source, and service requirements associated with a queue.

4. The system of claim 3 wherein values of the effective length vary directly with queue size.

5. The system of claim 4 wherein the control means is also for discarding at least one packet of data of a selected queue associated with a queue group component that has a longest effective length among a hierarchical group under consideration for discard.

6. The system of claim 5 wherein the hierarchical group under consideration is associated with a queue group component at a higher level in the hierarchy that has the longest effective length of its associated group.

7. The system of claim 6 wherein the control means is for discarding multiple packets of data from the selected queue regardless of whether the queue group component associated with the selected queue ceases to have the longest effective length in its group before all of the multiple packets of data are discarded.

8. The system of claim 1 wherein the control means is configured to determine the effective lengths for at least two different hierarchical components differently.

9. The system of claim 1 wherein the control means is configured to discard at least one packet of data of a queue associated with a queue group component having an effective length that is within a highest-length range of effective lengths associated with a hierarchical group under consideration for discard.

10. A method for hierarchically storing packetized data and transferring the packetized data, the method comprising:
    receiving packets of data at an input;
    storing the received packets of data in queues according to a hierarchy where each level of the hierarchy includes at least one group of queue group components, and where at least one of the queue group components in each level other than a lowest level of the hierarchy includes a group of queue group components associated with a logically-lower level of the hierarchy each queue group component being associated with at least one of a logically-lower queue and a logically-lower queue group;
    determining effective lengths of the queue group components; and
    discarding at least one packet of data of a selected queue associated with a queue group component that has a longest effective length among a hierarchy group under consideration for discard.

11. The method of claim 10 wherein the lower level is immediately logically lower in the hierarchy.

12. The method of claim 10 wherein determining the effective lengths is based on at least one of queue size, type of source, size of source, and service requirements associated with a queue.

13. The method of claim 12 wherein values of the effective length vary directly with queue size.

14. The method of claim 10 wherein the hierarchy group of queues under consideration is associated with a queue group component at a higher level in the hierarchy that has the longest effective length of its associated group.

15. The method of claim 14 wherein the discarding of at least one packet includes discarding multiple packets of data from the selected queue regardless of whether the queue group component associated with the selected queue ceases to have the longest effective length in its group before all of the multiple packets of data are discarded.

16. The method of claim 10 wherein determining the effective lengths for at least two different hierarchy components is determined differently.

17. The method of claim 10 further comprising discarding at least one packet of data of a queue associated with a queue group component having an effective length that is within a highest-length range of effective lengths associated with a hierarchy group under consideration for discard.

* * * * *